US006581896B1

United States Patent
Olexovitch

(10) Patent No.: US 6,581,896 B1
(45) Date of Patent: Jun. 24, 2003

(54) BALUSTER CLAMP

(76) Inventor: Steven Olexovitch, 2096 Raleigh Rd., Hummelstown, PA (US) 17036

( * ) Notice: Subject to any disclaimer, the term of this patent is extended or adjusted under 35 U.S.C. 154(b) by 0 days.

(21) Appl. No.: 10/113,131

(22) Filed: Mar. 29, 2002

Related U.S. Application Data

(60) Provisional application No. 60/345,530, filed on Jan. 7, 2002.

(51) Int. Cl.[7] .......................... F16B 35/04; F16M 13/02
(52) U.S. Cl. ............... 248/534; 248/222.14; 248/228.5; 248/231.61; 411/419
(58) Field of Search .................................. 411/418, 419; 248/511, 534, 539, 222.14, 222.52, 228.5, 230.5, 231.61, 231.85

(56) References Cited

U.S. PATENT DOCUMENTS

| 2,102,881 A | * | 12/1937 | Blackburn et al. ........... 439/779 |
| 2,289,516 A | * | 7/1942 | McCullough et al. ........ 411/419 |
| 3,552,257 A | * | 1/1971 | Tanabe ........................ 411/368 |
| 4,059,248 A | | 11/1977 | Kuntz ........................ 248/214 |
| D292,783 S | | 11/1987 | Restrepo .................... D11/182 |
| 4,903,929 A | | 2/1990 | Hoffman ..................... 248/229 |
| 5,039,056 A | | 8/1991 | Paxton ........................ 248/539 |
| 5,826,852 A | | 10/1998 | McKeown .................. 248/519 |
| 5,832,872 A | * | 11/1998 | Pearce ........................ 119/477 |
| 5,857,658 A | | 1/1999 | Niemiec ..................... 248/534 |
| 6,189,489 B1 | * | 2/2001 | Pearce ........................ 119/477 |
| 6,209,837 B1 | | 4/2001 | Harms ........................ 248/302 |

* cited by examiner

Primary Examiner—Ramon O. Ramirez
Assistant Examiner—Jon Szumny
(74) Attorney, Agent, or Firm—Martin Fruitman

(57) ABSTRACT

The apparatus is a clamp to hold flagpoles, plant support rods, and other items on rod-like structures, vertical posts (balusters) of stair or porch railings, and fences. The preferred embodiment is a large plastic split bolt with a knob-like head, structure on one end and a through slot, in the split bolt forming two separated sections with exterior threads. The slot is dimensioned so that a rod-like item fits within it. A threaded nut screws onto the threaded split sections of the bolt and tightens the clamp onto the rod-like structure. The head structure has a hole within it which is oriented at an angle to the vertical, so that a pole can be inserted into the hole and will support a container or a flag-extending up and away from the clamp and rod structure on which it is mounted.

5 Claims, 2 Drawing Sheets

BALUSTER CLAMP

This application is based upon provisional patent application Ser. No. 60/345,530 filed Jan. 7, 2002.

BACKGROUND OF THE INVENTION

This invention deals generally with clamping devices and more specifically with an apparatus for clamping a device to a rod-like support.

It is becoming more common to see flags, flower pots and other decorative items displayed on the exterior of buildings, and the means of attaching such items to the buildings are almost as diverse as the buildings themselves. However, most attachment devices depend on one of two conventional systems. They either use a plate or fixture held down by screws driven into a wooden part of the building, such as a window sill or a railing, or they use a variation on the classic "C" clamp.

Neither of these two systems is completely satisfactory. Aside from not being decorative, the "C" clamp devices also include a threaded thumbscrew which usually extends away from the structure and can be a protruding hazard The screw held fixtures raise other problems. Not only do many home-owners and virtually all landlords not want holes drilled into the building, but the process also requires tools and is a more complicated effort than many people want deal with. There is also the additional problem that there may not always be a wood surface available at the location where a decorative item is to be displayed. One such location is a wrought iron railing.

It would be very beneficial to have available an attractive device which easily clamps onto railings and supporting balusters to hold flags, rod supported items, and other decorative items, but does not require tools for installation and does not itself create a hazard.

SUMMARY OF THE INVENTION

The present invention is a wonderfully simple structure which can be used to attach decorative items to any rod-like structure. For most residential structures the invention will be attached to balusters which support deck, stair or porch railings, but the invention can be used to attach items to any structure which is dimensioned so that the clamp section of the invention will fit around the structure. For example it can even be used to attach items to small trees.

The invention is formed of two basic sections, a clamp and a holder. The clamp is essentially a split bolt with a head structure. The split bolt has a large through slot between two solid bolt segments that have threads on their outside surfaces. A nut with inside threads which match the threads on the solid segments is screwed onto the split bolt so that the surfaces of the nut and the head structure can be tightened upon and compress anything that fits within the slot. Even an item which is significantly smaller than the width of the slot can be clamped tightly between the head and the nut in the direction of the length of the slot.

The holder structure of the invention is attached to the head of the split bolt and can be constructed in a variety of forms. Typically the holder and the clamp are molded as an integrated unit, and virtually any plastic material can be used. The preferred embodiment of the invention uses injection molded plastic and has a holder structure that is a simple solid body with a hole through it. In anticipation of the use of the invention on a baluster, the through hole for the preferred embodiment is oriented at an angle to the parallel surfaces of the nut, but is in the same plane as the slot in the clamp section. Thus, when the clamp is properly placed on a vertical rod such as a baluster, the through hole in the holder is in a vertical plane, but angled so that the upper opening of the hole is farther from the nut and the baluster than is the lower opening of the hole. Therefore, when a pole for a flag or a plant basket hook is placed within the holder's hole, the top of the pole extends up and away from the baluster, so that it does not interfere with the railing supported by the baluster. Furthermore, if a pole extends through the bottom of the hole it hits the baluster below the clamp, and the baluster thereby acts as a lower stop for the pole.

Other holders can also be used with the clamp. For example, a two piece holder with mating serrated surfaces and a clamping screw, with one serrated surface attached to the head of the slotted bolt and a pole holding cylinder attached to the other serrated surface, furnishes a flag pole holder with a large range of angular adjustment.

Thus, the clamp of the invention supplies a versatile holder that clamps onto any rod-like structure and can support a variety of items. The invention has the added advantages that it is preferred that it be tightened by hand without tools, it is small and unobtrusive, and, when the nut is formed as a cap nut, it has no protruding hazardous parts.

DETAILED DESCRIPTION OF THE INVENTION

Figure 1:
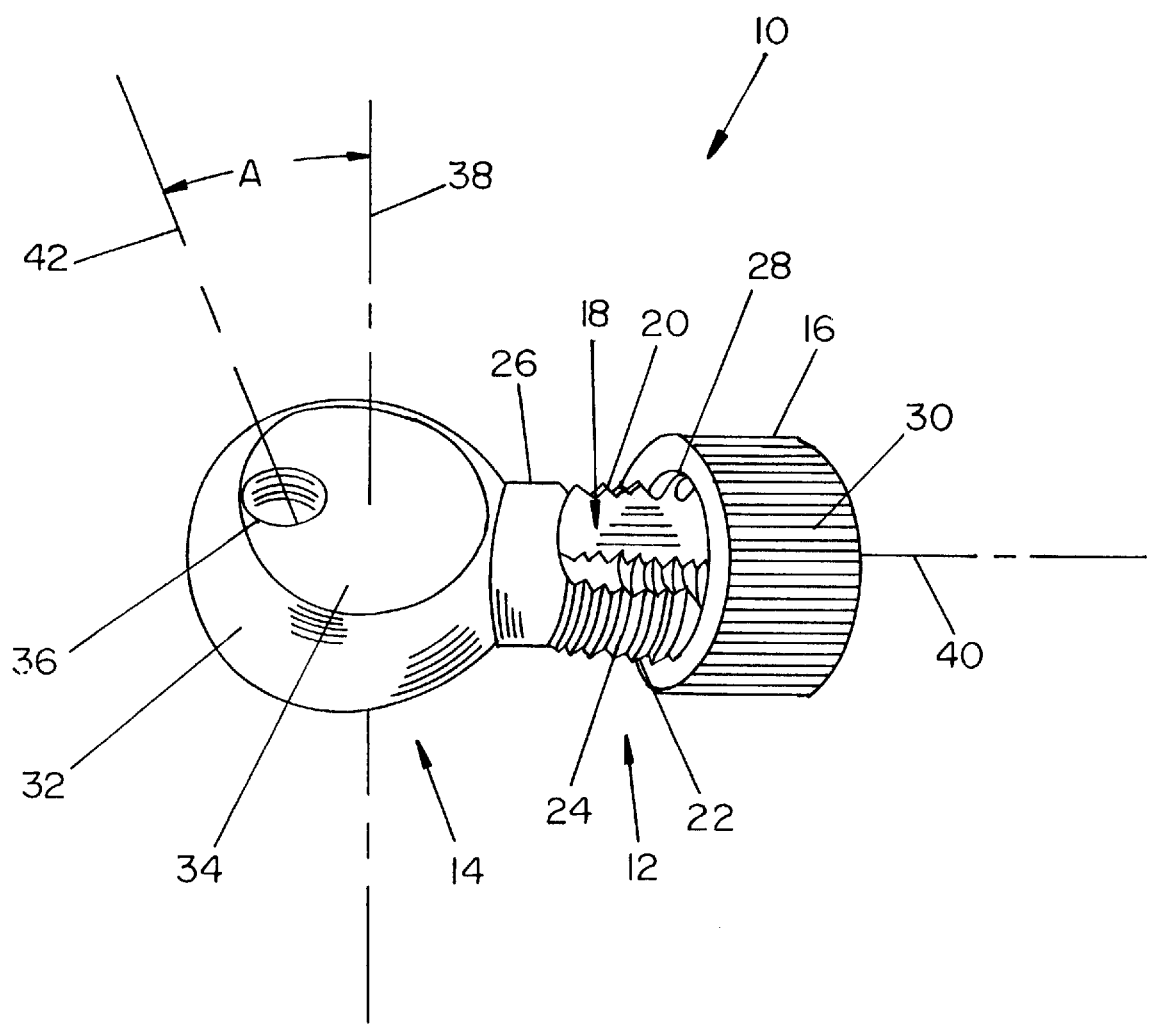
FIG. 1 is a perspective view of the preferred embodiment of the invention.

FIG. 1 is a perspective view of the preferred embodiment of clamp 10 of the invention in which clamp section 12 and holder section 14 are formed as a single piece with only nut 16 separable from the rest of clamp 10.

Figure 2:
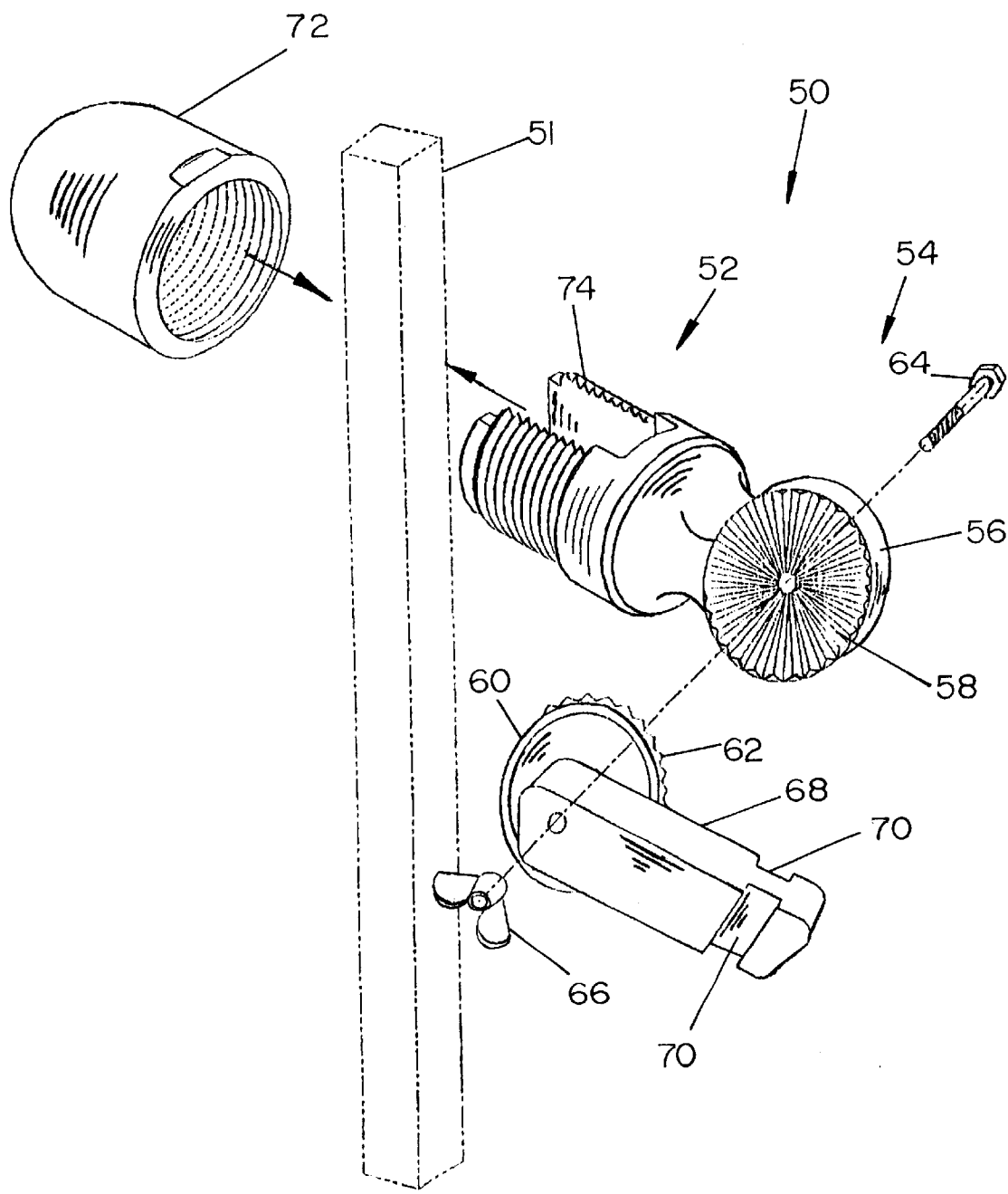
FIG. 2 is an exploded perspective view of an alternative embodiment of the invention which uses a different holder structure.

Clamp section 12 is a split bolt formed with slot 18 between sides 20 and 22 which have outside threads 24. Head 26 forms the closed end of clamp section 12, supports sides 20 and 22, and maintains the spacing between sides 20 and 22. Nut 16 has inside threads 28 which mate with outside threads 24 and also may have knurled surface 30 to facilitate tightening nut 16 onto slot sides 20 and 22 by hand. The utilization of a cap nut for nut 16, as shown in FIG. 2, can provide a cover for the only sharp edges on the preferred embodiment. Holder section 14 is attached to head 26, and, in the preferred embodiment shown in FIG. 1, it is formed as solid partial sphere 32 with flat surface 34.

Hole 36 within sphere 32 is the structure which actually holds poles (not shown) for items such as flags, plant hooks, and birdhouses. Transverse axis 38 of sphere 32 is in the plane of slot 18 and at a right angle to axis 40 of clamp section split bolt 12. For some applications it is advantageous to orient hole 36 in the plane of slot 18 and at an angle to transverse axis 38. In the preferred embodiment, angle A between axis 42 of hole 36 and transverse sphere axis 38 is in the range of between 15 and 60 degrees. When clamp 10 is in use, it will typically be attached to a vertical rod such as a baluster, and transverse sphere axis 38 will therefore be oriented vertically. Such an installation places hole 36 in a vertical plane with its axis at least 15 degrees from the vertical. This affords the advantage that the upper portion of any pole inserted into hole 36 will extend away from the rod upon which clamp 10 is mounted, and any item hung on the pole will not interfere with the rod or anything that the rod itself supports. Another more subtle advantage of angle A of hole axis 42 is that when hole 36 is a through hole, since it is oriented in the same plane as the rod upon which clamp 10 is supported, the end of any pole extending through the bottom of hole 36 will rest against the supporting rod, and the pole will be prevented from slipping through hole 36.

Typical dimensions of the size of the preferred embodiment of clamp 10 which functions well for wrought iron railings are listed below.

Overall length: 92 mm

Diameter of bolt 12 and head 26: 25 mm

Length of threaded portion of split bolt 12: 40 mm

Length of head 26: 10 mm

Outside diameter of nut 16: 44 mm

Width of slot 18: 13 mm

Diameter of sphere 32: 43 mm

Diameter of flat surface 34: 32 mm

Diameter of hole 36: 8 mm

FIG. 2 is an exploded perspective view of an alternative embodiment of the invention in which clamp 50 clamps around baluster 51. Clamp 50 has clamp section 52 which is essentially the same as clamp section 12 in FIG. 1, but holder section 54 is different from holder section 14 shown in FIG. 1.

Holder section 54 of FIG. 2 has the capability of angular adjustment for a device (not shown) which it holds. Holder section 54 is constructed with two mating parts, stationary disc 56 with radial teeth 58 and rotatable disc 60 with radial teeth 62. Thus, once the discs 56 and 60 are oriented with a desirable angular rotation, to each other, they can be locked in that orientation by clamping them together with bolt 64 and wing nut 66.

FIG. 2 shows a device holder 68 which differs from hole 36 of FIG. 1. Device holder 68 is an arm attached to rotatable disc 60 to take full advantage of the capability of rotation. Device holder 68 also includes exterior slots 70 which are used to hold devices other than simple rods. Such slots can function to hold items such as shelves or can prevent simple hanging hooks from falling off.

FIG. 2 also shows cap nut 72 that provides a cover for the ends of split bolt 74 that are the only sharp edges on clamp 50, and cap nut 72 therefore eliminates any clothes snagging hazard.

The clamp of the present invention thereby furnishes a compact, safe, and attractive device for attaching items to rod-like structures, and eliminates the need for drilling holes or using tools to install the clamp.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, holder section 14 need not be a partial sphere, and, as seen in FIG. 2, virtually any holding fixture can be integrated with clamp section 12 of the invention, so that even a handrail or a seat can be installed using the invention. Furthermore, hole 36 need not have a circular cross section.

What is claimed as new and for which Letters Patent of the U.S. are desired to be secured is:

1. An apparatus for clamping onto a structure comprising:
   a split bolt with an axis, the split bolt comprising two threaded side sections separated by a through slot with the side sections attached to a head structure at one end of the slot and the other end of the slot being open;
   a holder attached to the head structure with the holder having a transverse axis that is located in the same plane as the slot and with the transverse axis of the holder oriented at a right angle to the axis of the split bolt,
   a hole into which a pole can be inserted formed within the holder, with the hole located in a plane parallel to the slot in the split bolt and the hole oriented at a non-perpended angle to the transverse axis of the holder; and
   a nut with inside threads which match the threads on the side sections so that the nut can be threaded onto the split bolt, and a structure positioned in the slot can be compressed between the nut and the head structure.

2. The apparatus of claim 1 wherein the angle of the hole is in the range of between 15 and 60 degrees to the transverse axis of the holder.

3. The apparatus of claim 1 wherein the holder is a partial sphere.

4. The apparatus of claim 1 wherein the nut is a cap nut.

5. The apparatus of claim 1 wherein the hole within the holder is in the same plane as the slot in the split bolt.

\* \* \* \* \*